United States Patent [19]
Tomlin

[11] 3,978,543
[45] Sept. 7, 1976

[54] WINDSCREEN WIPERS

[75] Inventor: Robert Derrick Tomlin, Hampton Hill, England

[73] Assignee: Magnatex Limited, Middlesex, England

[22] Filed: Apr. 16, 1974

[21] Appl. No.: 461,421

[30] Foreign Application Priority Data

Mar. 3, 1970 United Kingdom .................10218/70
May 9, 1973 United Kingdom................22230/73

[52] U.S. Cl. ............................................. 15/250.42
[51] Int. Cl.² ............................................. B60S 1/04
[58] Field of Search....... 15/250.32, 250.35, 250.42, 15/250.36

[56] References Cited
UNITED STATES PATENTS

| | | | |
|---|---|---|---|
| 3,085,277 | 4/1963 | Bock et al........................ | 15/250.32 |
| 3,176,337 | 4/1965 | Glynn .............................. | 15/250.42 |

FOREIGN PATENTS OR APPLICATIONS

| | | | |
|---|---|---|---|
| 1,097,052 | 12/1967 | United Kingdom.............. | 15/250.42 |

*Primary Examiner*—Peter Feldman
*Attorney, Agent, or Firm*—Brisebois & Kruger

[57] ABSTRACT

The invention relates to a windscreen wiper comprising a squeegee element and a pressure-distributing harness, moulded of a resilient plastics material, comprising one or more pairs of resiliently flexible arms extending in opposite longitudinal directions from a central portion constituting or having attached thereto a wiper arm connector, and including claws at the free ends of the arms and adjacent the central portion which connect with the squeegee element, directly or indirectly, at pressure-distributing spaced locations therealong, said arms being biassed to cause the wiping edge of the squeegee element, when unrestrained, to be curved along its length, and flexing to allow the squeegee element to conform to the curvature of the windscreen over which it wipes.

10 Claims, 6 Drawing Figures

U.S. Patent   Sept. 7, 1976   Sheet 1 of 2   3,978,543
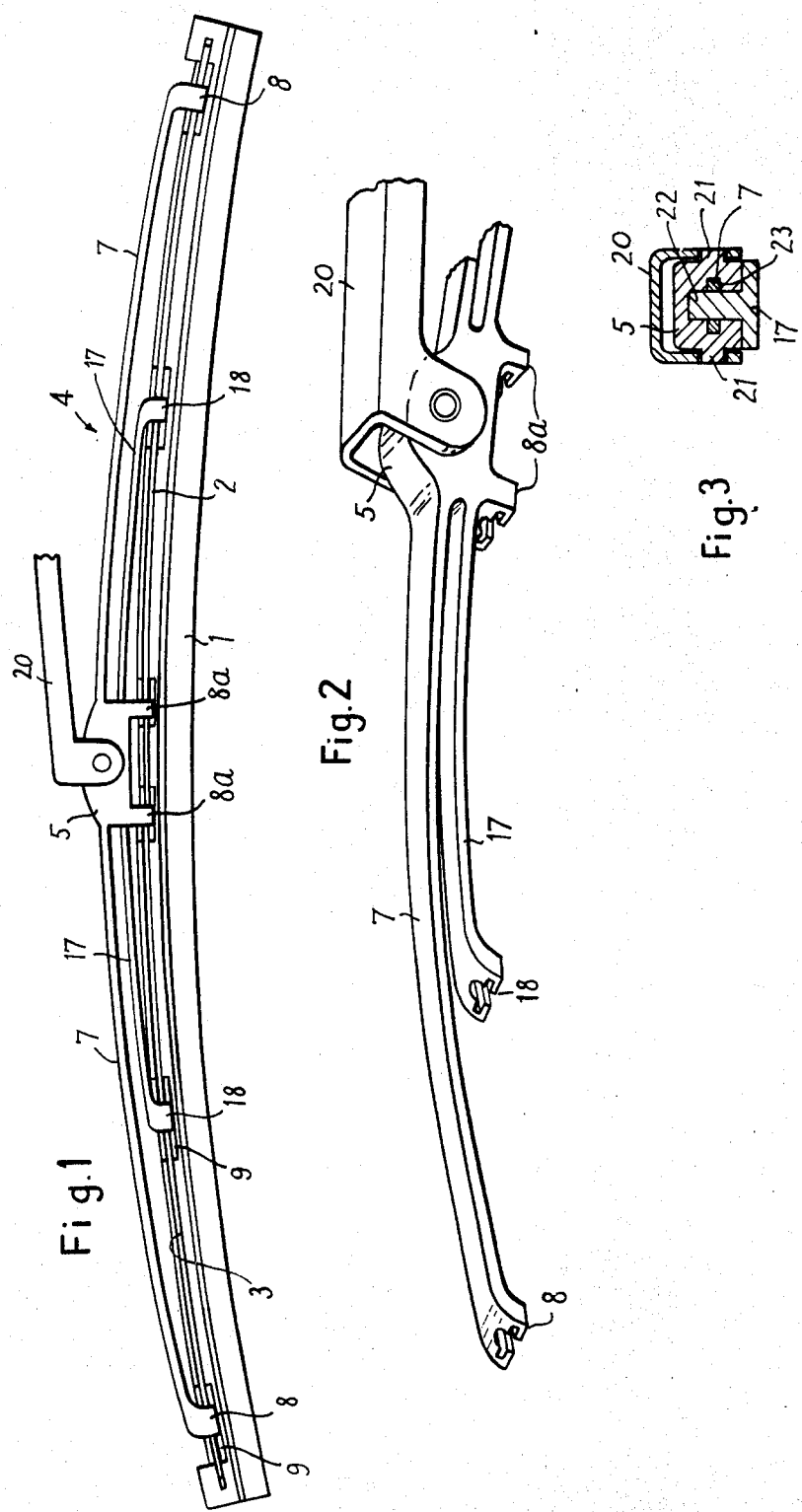

U.S. Patent  Sept. 7, 1976  Sheet 2 of 2  3,978,543
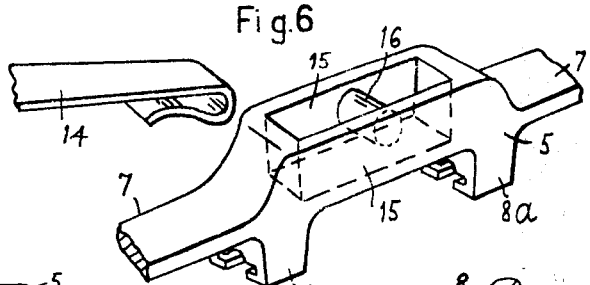
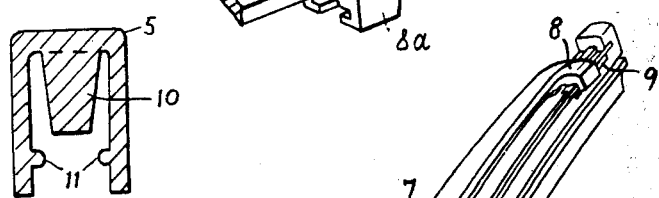
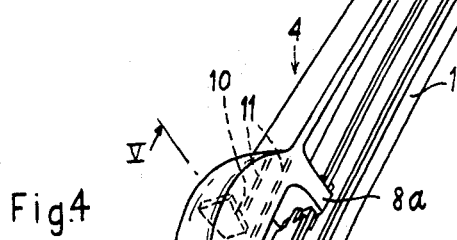
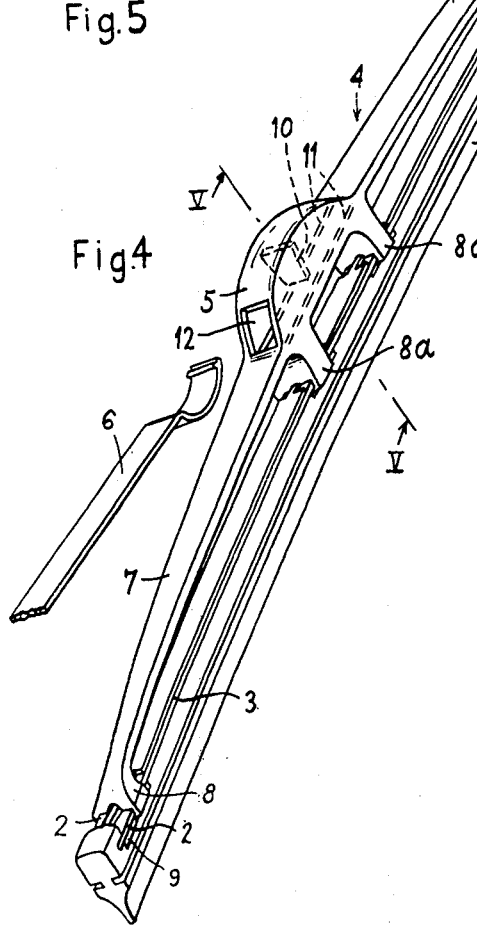

WINDSCREEN WIPERS

BACKGROUND OF THE INVENTION

This invention relates to a windscreen wiper, primarily for curved windscreens.

Windscreen wipers for curved windscreens conventionally comprise a pressure-distributing harness consisting of pivotally interconnected yokes or the like made of metal and connected to spaced points along the squeegee element. In some cases the pressure-distributing harness has been made of plastics materials, but these have not proved commercially successful for various reasons, including cost, bulky appearance leading to obstruction of the driver's vision, and degradation of the plastics material where the wiper is subject to high ambient temperatures.

An object of the invention is to provide a wiper having a pressure-distributing harness made of plastics material which is simple and cheap to manufacture and which does not obstruct a driver's vision substantially any more than the conventional wiper with a pressure-distributing harness made of metal.

Another object is to provide a wiper having a pressure-distributing harness made of plastics material which is simple and cheap to manufacture and resists failure when used in hot climates.

SUMMARY OF THE INVENTION

The invention consists in a windscreen wiper comprising a squeegee element and a pressure-distributing harness, moulded of a resilient plastics material, preferably a polycarbonate, comprising a pair of resiliently flexible arms extending in opposite longitudinal directions from a central portion constituting or having attached thereto a wiper arm connector, and including claws depending by fixed distances from adjacent the central portion and from the free ends of the arms respectively, said claws being connected to the squeegee element respectively adjacent its centre and its opposite ends, and said arms being biassed to cause the wiping edge of the squeegee element, when unrestrained, to be curved along its length and being flexible to allow the squeegee element to conform to the surface of the windscreen of which it is adapted to wipe.

Two or more pairs of flexible arms may extend in opposite longitudinal directions from said central portion, the arms being of different lengths, the claws at the ends of the longer arms being connected to the squeegee element adjacent its ends and the claws of the shorter arms being connected to the squeegee element at locations intermediate the ends of the squeegee element and the claws depending from adjacent the central portion.

The above and other objects and advantages of the invention will be apparent from the following description and the accompanying drawings.

BRIEF DESCRIPTION OF THE DRAWINGS

FIG. 1 is a side view of one embodiment,

FIG. 2 is a scrap perspective view of the harness of FIG. 1,

FIG. 3 is a section through the centre of the harness showing one mode of construction, FIG. 4 is a perspective view of another embodiment, FIG. 5 is a section along the line V—V of FIG. 4, and FIG. 6 is a scrap view of a modification.

DESCRIPTION OF THE PREFERRED EMBODIMENTS

Referring to the drawing, the windscreen wiper shown in FIGS. 1 and 2 comprises a squeegee element 1 having flexible metal strips 2 constituting flexors (i.e. members which permit the squeegee element to flex in its own plane perpendicular to the windscreen surface but resist flexing of the squeegee element transversely thereto) arranged in grooves 3 along opposite sides thereof in the manner generally described in British Pat. No. 930,097.

The squeegee element is mounted in a pressue-distributing harness 4 moulded of a resilient plastics material, preferably a polycarbonate such as known under the Trade Mark "LEXAN". The harness 4 comprises a central portion 5, which also serves as or carries a wiper arm connector 20. From opposite ends of the central portion 5 extend two flexible supporting arms 7 and 17. The arms are each provided at their ends with claws 8, 18 respectively, depending by fixed distances from the arms, which embrace the edges of the flexible strips 2, for which purpose portions of the flanges defining the grooves 3 may be removed to provide recesses 9. Claws 8a, similar to the claws 8 and 18, depending by fixed distances from opposite ends of the central portion 5 also embrace the edges of the strips 2 to support the squeegee element. The claws 8, 18 and 8a may be formed with recesses or slots to embrace the strips 2 either in the moulding die or subsequently.

The supporting arms 7, 17 are biassed so that, as shown, the claws 8, 18 normally extend below the level of the claws 8a, the claws 8 normally being below the claws 18. Such bias may be imparted by the shape to which the arms are moulded. Thus a concave curvature is imparted to the wiping edge of the squeegee element when it is unrestrained. Due to the resilience of the arms 7, 17, when the wiper is applied to a windscreen, they are able to flex to allow the squeegee element to conform to the surface of the windscreen, the wiper arm pressure exerted on the central claws 8a keeping the central zone of the squeegee element against the screen as the arms 7, 17 flex to allow the wiping edge to conform to an increased radius of curvature compared with that which the blade assumes when free.

Of all the plastics materials tested, I have found polycarbonates to be the most resistant to taking a permanent set when the wiper is subject to hot sun temperatures while resting in the "parked" position. Any such permanent set, of course, affects the resilient action of the arms of the harness and reduces the effectiveness of the wipe.

The pressure-distributing harness can be moulded in one piece of plastics material or alternatively may be moulded in two or more parts which are subsequently bonded or otherwise joined together. For example as shown in FIG. 3, which is a section through the centre of a harness according to one construction, the central portion 5 is moulded as an inverted channel with trunnions 21 on which the wiper arm connector 20 pivots. The shorter arm 17 is integrally moulded with the claws 18 and 8a and has a central upstanding web portion 22 which is adapted to fit in the channel of the central portion and be secured therein. The interior surface of the side walls of the central portion 5 are formed with longitudinal recesses 23 in which is fitted the arm 7 which is formed at its centre with an opening to allow the web portion 22 to pass therethrough and to locate the arm 7 against longitudinal movement. The parts may be secured together by adhesive.

Instead of providing the central portion 5 with longitudinal recesses 23, the spacing of the two arms may be effected by a spacer member. Several flexible arms may be assembled as described to form a pressure-distributing harness.

FIGS. 4 and 5 shows another embodiment of a windscreen wiper according to the invention, in which the harness comprises only one flexible arm extending in each direction. It is therefore only suitable for shorter blade lengths, up to about 14 inches, than the embodiment of FIG. 1. Like parts bear the same reference numbers in FIGS. 4 and 5 as in FIG. 1.

The pressure-distributing harness 4 is moulded in one piece or two or more parts of a resilient plastics material and comprises a central portion 5, which also serves as a connector to receive the end of a wiper arm 6 (shown separated), from opposite ends of which extend supporting arms 7. The arms are provided at their ends with claws 8, depending by fixed distances from the arms, which embrace the edges of the flexible strips 2 as shown, portions of the flanges defining the grooves 3 being removed to provide recesses 9. Claws 8a, similar to the claws 8, depending by fixed distances from opposite ends of the central portion 5 also support the squeegee element.

The supporting arms 7 are biassed so that, as shown, the claws 8 normally extend below the level of the claws 8a and a concave curvature is imparted to the wiping edge of the squeegee element when it is unrestrained. Due to the resilience of the arms 7, when the wiper is applied to a windscreen, they are able to flex to allow the squeegee element to conform to the surface of the windscreen, the wiper arm pressure exerted on the central claws keeping the central zone of the squeegee element against the screen as the arms 7 flex to allow the wiping edge to conform to an increased radius of curvature compared with that which the blade assumes when free.

The central portion 5 is, in the embodiment shown in FIG. 4, made hollow and has a generally inverted channel shape to receive a wiper arm end of the hook type. As more clearly shown in FIG. 5, a flexible web 10 depends from the top wall of the channel portion and two opposed ribs 11, spaced below the bottom end of the web 10, extend along the inner faces of the side walls. Openings 12 are provided in the top wall of the channel portion to receive the end of the wiper arm. When the end of the wiper arm is inserted, the flexible web 10 serves to engage the projection at the end of the hook end, and prevent accidental disengagement of the wiper arm from the wiper.

In modification shown in FIG. 6, the central portion is constructed to receive the end of a wiper arm 14 of the crook type and comprises a pair of spaced side walls 15 bridged by a transverse pin 16 which may be moulded integrally with the central portion.

It will be understood that various modifications may be made without departing from the scope of the invention. For example instead of providing the central portion 5 with two claws 8a, a single claw may be provided at the centre of the harness. The claws can be assembled to the squeegee element other than by engaging with flexible strips 2 as shown. They can engage with the squeegee element itself or flexors of different construction.

What I claim:

1. A windscreen wiper comprising a squeegee element and a pressure-distributing harness, moulded of a resilient plastics material, comprising a pair of resiliently flexible arms, flexible along substantially their entire lengths, extending in opposite longitudinal directions from each side of a substantially rigid central portion adapted for connection of a wiper arm thereto, one arm of each pair being shorter than the other and including claws depending by fixed distances from adjacent said central portion and from the free ends of the arms respectively, said claws being connected to the squeegee element respectively adjacent its centre and its opposite ends, and said arms being biassed over substantially their entire lengths to cause the wiping edge of the squeegee element, when unrestrained, to be curved along its length.

2. A windscreen wiper as claimed in claim 1, wherein the central portion constitutes a wiper arm connector adapted to receive a wiper arm end of the hook type, said central portion being hollow and having a generally inverted channel shape, a flexible web depends from the top wall of the channel and two opposed ribs, spaced below the bottom end of the web, extend along the inner faces of the side walls, at least one opening being provided in said top channel wall for inserting the end of the wiper arm.

3. A windscreen wiper as claimed in claim 1, wherein the central portion constitutes a wiper arm connector adapted to receive a wiper arm end of the crook type and comprises a pair of spaced side walls bridged by an integrally moulded transverse pin.

4. A windscreen wiper as claimed in claim 1, wherein the pressure-distributing harness comprises a one-piece plastics moulding.

5. A windscreen wiper as claimed in claim 1, wherein the squeegee element has flexors extending therealong, said flexors comprising flexible metal strips arranged in grooves along opposite sides of the squeegee element, and wherein the claws embrace the edges of said flexible strips.

6. A windscreen wiper as claimed in claim 1, wherein the harness is moulded of a polycarbonate plastics material.

7. A windscreen wiper as claimed in claim 1, wherein two claws are provided adjacent the centre of the harness, adjacent opposite ends of the central portion.

8. A windscreen wiper as claimed in claim 1, one arm of each pair being of such length that the claw at the end thereof is connected to the squeegee element adjacent its one end of said squeegee, and the other arm of each pair being shorter than said one arm and having the claw at its free end connected to the squeegee element at a location intermediate the claws at the ends of said squeegee and adjacent the central portion, the arms of each of said pairs of arms being biassed to cause the wiping edge of the squeegee element, when unrestrained, to assume a concave curve along its length.

9. A windscreen wiper as claimed in claim 8, wherein the pressure-distributing harness comprises a one-piece plastics moulding.

10. A windscreen wiper as claimed in claim 8, wherein the harness is moulded of a polycarbonate plastics material.

* * * * *